United States Patent [19]

Weber

[11] Patent Number: 5,435,625
[45] Date of Patent: Jul. 25, 1995

[54] HYDRAULICALLY CONTROLLED SEAT ADJUSTER AND RECLINER MECHANISMS FOR VEHICLE SEATS

[75] Inventor: James L. Weber, West Bloomfield, Mich.

[73] Assignee: Hoover Universal, Inc., Milwaukee, Wis.

[21] Appl. No.: 109,877

[22] Filed: Aug. 20, 1993

[51] Int. Cl.6 .............................................. B60N 2/02
[52] U.S. Cl. ................... 297/362.13; 297/354.12
[58] Field of Search ........... 297/344.1, 362.13, 354.12; 296/65

[56] References Cited

U.S. PATENT DOCUMENTS

| | | |
|---|---|---|
| 2,615,499 | 10/1952 | Wallace . |
| 2,630,887 | 3/1953 | Panquin ..................... 297/362.13 |
| 3,024,067 | 3/1962 | Brandoli . |
| 3,338,632 | 8/1967 | Kleinsorge . |
| 3,744,844 | 7/1973 | Nomaki et al. . |
| 3,765,720 | 10/1973 | Sakai et al. . |
| 3,807,796 | 4/1974 | Wirges . |
| 4,189,957 | 2/1980 | Gedig et al. . |
| 4,291,856 | 9/1981 | Urai . |
| 4,589,301 | 5/1986 | Griner . |
| 4,721,337 | 1/1988 | Tomita ......................... 297/344.1 |
| 4,805,866 | 2/1989 | Aihara et al. ................ 297/344.1 |
| 4,832,403 | 5/1989 | Tomita ......................... 297/344.1 |
| 4,964,608 | 10/1990 | Rogala et al. . |
| 4,969,621 | 11/1990 | Munchow et al. ........... 297/344.1 |
| 5,028,028 | 7/1991 | Yamada et al. . |
| 5,090,770 | 2/1992 | Heinrichs et al. ........... 297/362.13 |
| 5,150,872 | 9/1992 | Isomura ........................ 297/344.1 |
| 5,167,393 | 12/1992 | Hayakawa et al. . |
| 5,292,178 | 3/1994 | Loose et al. .................. 297/344.1 |

*Primary Examiner*—John T. Kwon
*Attorney, Agent, or Firm*—Leonard J. Kalinowski; E. L. Levine; Joseph E. Root III

[57] ABSTRACT

A hydraulically controlled seat adjuster mechanism for providing fore-and-aft adjustment in the position of a vehicle seat includes first and second hydraulic cylinders, which support the seat on the floor of the vehicle, the hydraulic cylinders being connected in a series hydraulic circuit with a control valve in a manually driven embodiment, and with a control valve and a pump and motor assembly in a power driven embodiment, the control valve being manually operable between a flow preventing condition to interrupt the hydraulic circuit in which the hydraulic cylinders are prevented from operating so that the seat is locked in position, and a flow permitting condition to complete the hydraulic circuit, permitting the hydraulic cylinders to operate and move the seat to an adjusted position. The hydraulic mechanism is also described with reference to an application for controlling the adjustment of the angle of inclination of the seat back relative to the seat cushion.

6 Claims, 4 Drawing Sheets

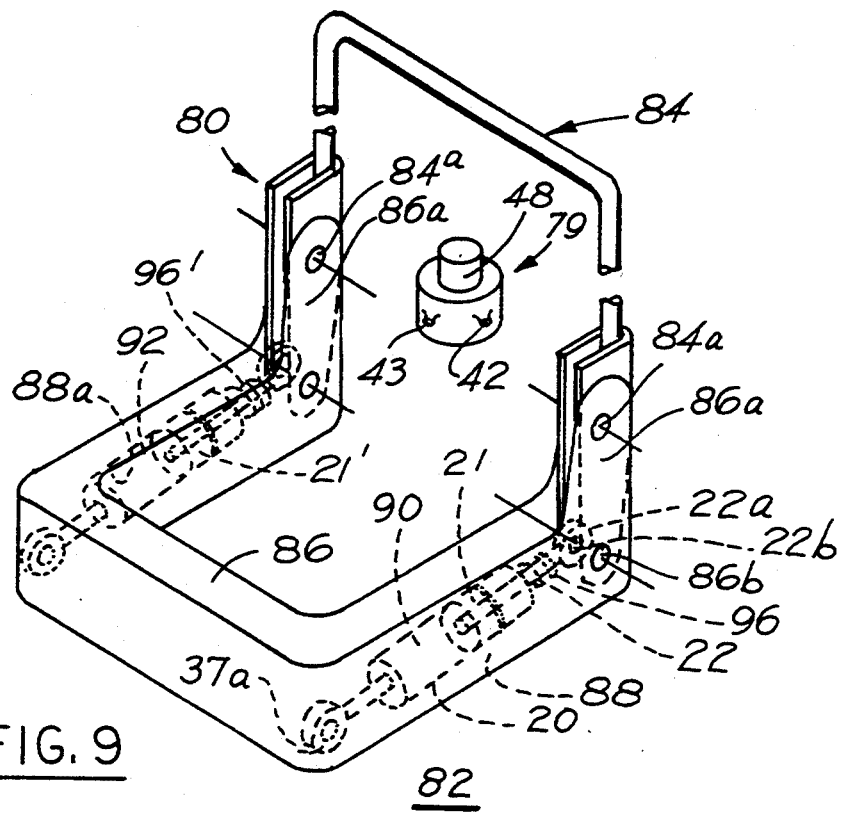
FIG. 9
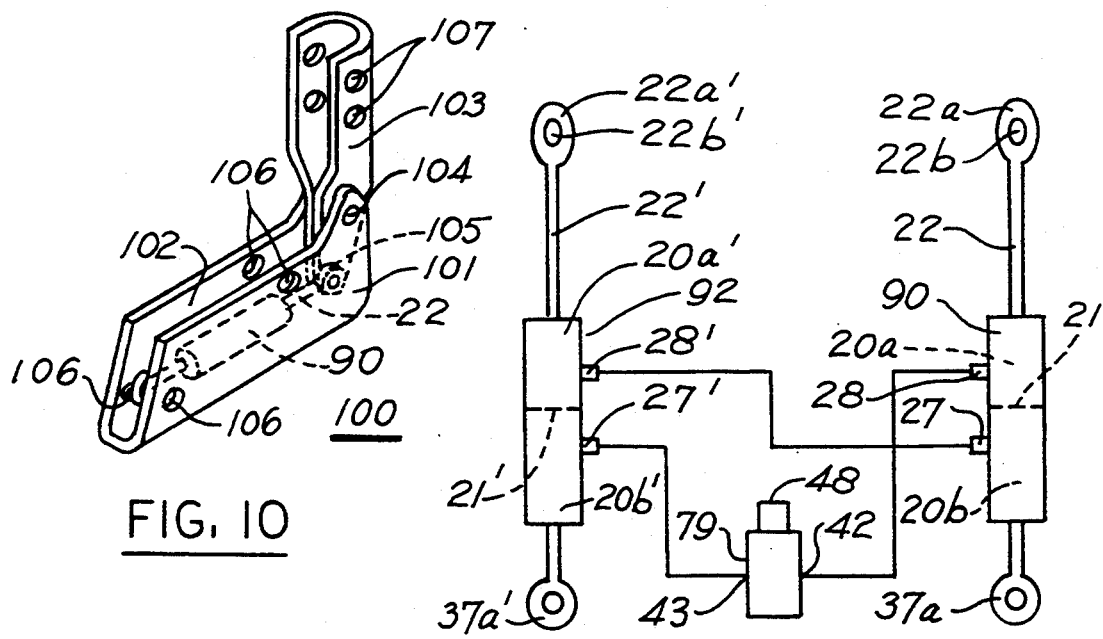
FIG. 10
FIG. 11

HYDRAULICALLY CONTROLLED SEAT ADJUSTER AND RECLINER MECHANISMS FOR VEHICLE SEATS

BACKGROUND OF THE INVENTION

This invention relates to vehicle seats, and more particularly, to hydraulically controlled seat adjuster and recliner mechanisms for vehicle seats.

In order to accommodate various sizes and shapes of occupants, the front seats of motor vehicles are provided with a fore-and-aft adjustment mechanism to enable occupants to position themselves a desired distance from the vehicle instrument panel, steering wheel and brake pedal. Such seat adjustment mechanisms provide incremental adjustment in the positioning of the vehicle seat. The seat adjustment mechanisms may be manually operable or power operated. In either case, the seat adjustment mechanism includes some means for maintaining the seat in the position to which it has been adjusted.

The manually operable seat adjustment mechanisms presently in use generally include a pair of laterally spaced lower rails which are fixed to the floor of the vehicle and a pair of upper rails slidably mounted on the lower rails. The seat adjustment mechanisms include mechanical devices such as gears, screws, bell cranks and the like to provide relative movement between the upper and lower slide rails in providing fore-and-aft adjustment of the seat. Such mechanisms are awkward to use because the occupant must reach down along the side of the seat and pull up or out on a release lever while shifting the position of the seat. Also, because such mechanisms define a finite number of positions at which the seat can be latched, frequently the seat does not become positively latched in a position to which it has been adjusted. These shortcomings are alleviated to some extent by power seat adjustment mechanisms.

Many power seat adjustment mechanisms utilize a rack and pinion arrangement for moving the seat fore and aft. The seat assembly is attached to a carriage that is slidable along a stationary rack mounted to the vehicle floor pan. The carriage is moved fore and aft by a pinion gear which is driven by a motor and transmission assembly running on a stationary rack. The machining tolerances of the rack and the carriage can result in an uneven meshing of the pinion gear teeth with the rack teeth over the length of travel of the rack. This creates noise and an uneven or jerky motion during the horizontal seat adjustment. For horizontal seat adjustment travel on the order of five inches, the noise and uneven motion is normally within acceptable levels. However, for horizontal seat adjustment travel greater than five inches, the noise level and uneven motion generally exceeds acceptable levels.

SUMMARY OF THE INVENTION

The present invention provides fluid pressure controlled seat adjuster and recliner mechanisms for a vehicle seat assembly. The fluid pressure operating mechanisms include first and second fluid pressure devices and fluid control means which connects the fluid pressure devices in a closed loop fluid circuit. The fluid control means includes a control valve which is manually operable between fluid flow preventing and fluid flow permitting conditions. Pistons of the first and second fluid pressure devices are maintained immobile when the control valve is in its flow preventing condition and are moved by fluid that is circulated through the fluid circuit when the control valve is in its fluid flow permitting condition.

In accordance with one embodiment, the fluid pressure operating means comprises a hydraulically controlled seat adjuster mechanism which controls the fore and aft adjustment of the vehicle seat. The hydraulically controlled mechanism provides both the sliding guidance and bidirectional horizontal drive for the seat assembly. In another embodiment of the hydraulically controlled seat adjuster mechanism, sliding rail assemblies provide the support and guidance for the seat assembly and the hydraulic controlled mechanism provides the horizontal driving force. In accordance with further embodiments, the hydraulic mechanism which includes a closed loop hydraulic circuit and a single control valve, controls the adjustment of the angle of inclination of the seat back relative to the seat cushion or the fore-and-aft horizontal location of the seat assembly.

The hydraulically controlled seat adjuster mechanism and the hydraulically controlled seat recliner mechanism can include a powered system or a manually operated system. The powered system includes a pump and motor assembly which moves the fluid through the closed fluid loop when the control valve is in its fluid flow permitting condition.

A manually powered system for a hydraulically controlled seat adjuster mechanism, or seat recliner mechanism, includes a return tension spring that pulls, or rotates, the seat forward, causing the fluid to transfer between cylinders. Rearward adjustment of the seat position requires a rearward effort from the occupant by pushing against the steering wheel and the floor of the vehicle and the seat back in the case of the seat position adjusting mechanism, or leaning against the seat back in the case of the seat recliner mechanism.

The invention consists of certain novel features and structural details hereinafter fully described, illustrated in the accompanying drawings, and particularly pointed out in the appended claims, it being understood that various changes in the details may be made without departing from the spirit, or sacrificing any of the advantages of the present invention.

DESCRIPTION OF THE DRAWINGS

FIG. 9 is an isometric view of a hydraulic recliner mechanism for a vehicle seat in accordance with the present invention;

FIG. 10 is an isometric view of an alternative embodiment of a hydraulic recliner mechanism for a vehicle seat; and, FIG. 11 is a simplified representation of the hydraulic circuit of the hydraulic recliner mechanism illustrated in FIG. 9.

DESCRIPTION OF PREFERRED EMBODIMENTS

Figure 1:
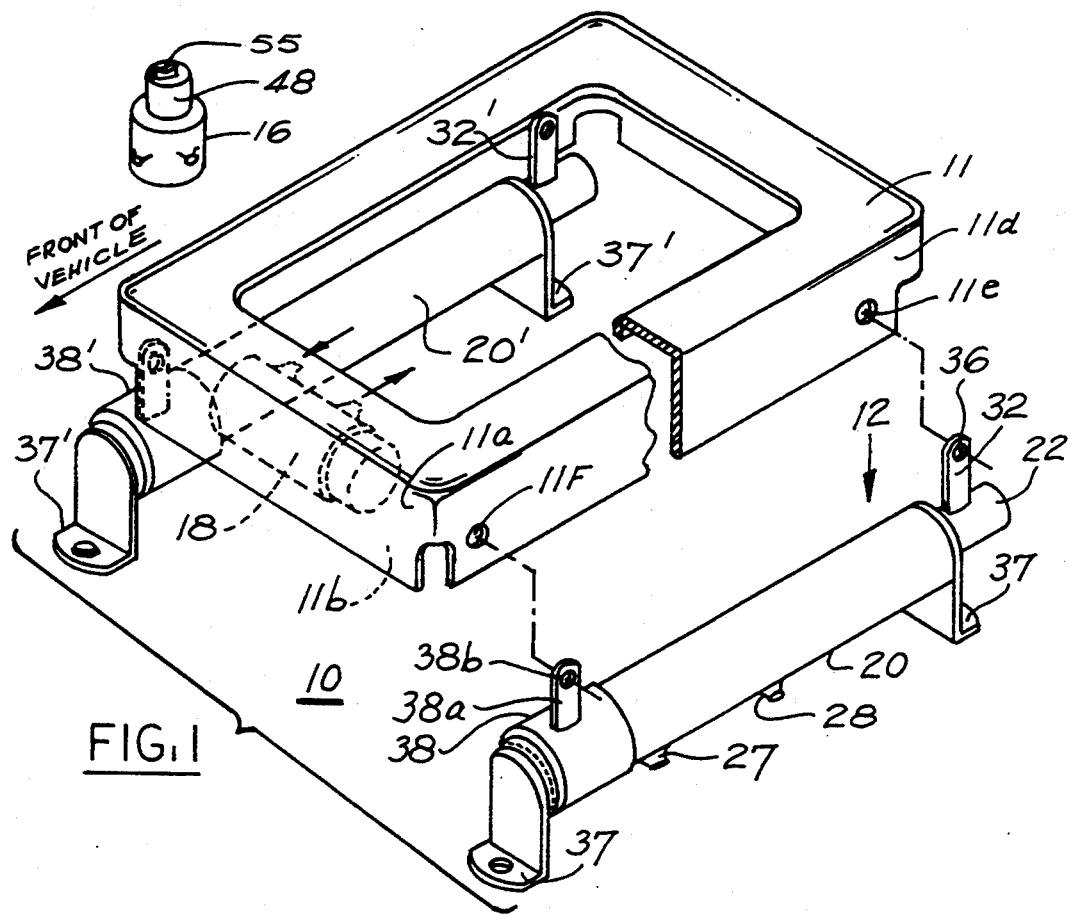
FIG. 1 is a perspective view of a hydraulic seat adjuster mechanism provided by the present invention, with one of the hydraulic cylinders shown detached from the seat pan.

Referring to FIG. 1 of the drawings, there is illustrated a perspective view of a fluid pressure controlled power seat adjuster mechanism 10 provided by the present invention. The fluid pressure controlled power seat adjuster mechanism 10 supports a vehicle seat assembly, represented in FIG. 1 as the seat pan 11, on the floor pan of the vehicle and controls the horizontal fore-and-aft movement of the vehicle seat assembly.

Figure 2:
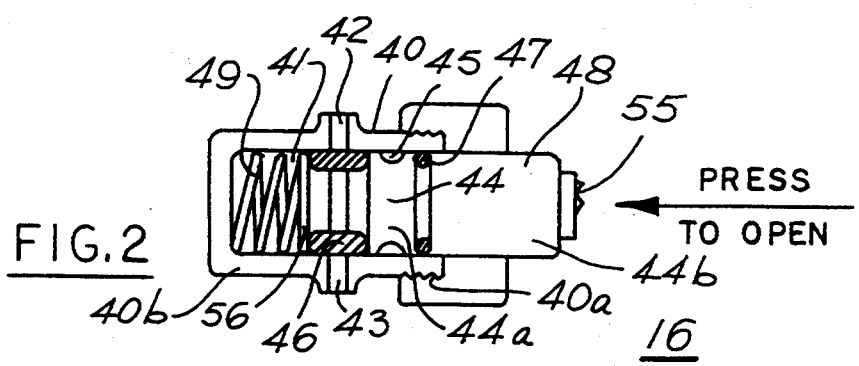
FIG. 2 is a section view of the control valve assembly of the hydraulic seat adjuster mechanism of FIG. 1.
Figure 3:
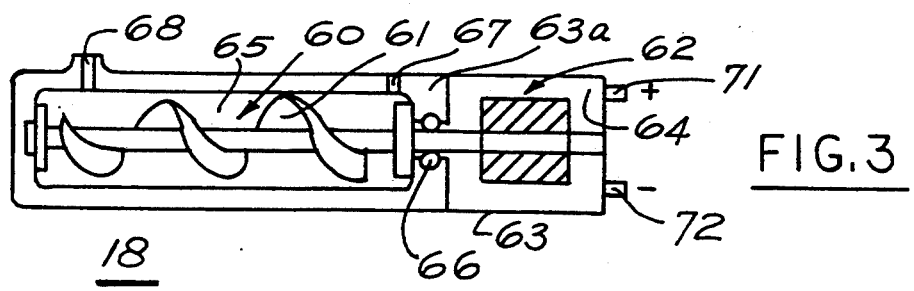
FIG. 3 is a section view of the pump and motor assembly of the hydraulic power seat adjuster mechanism of FIG. 1.

The fluid pressure controlled power seat adjuster mechanism includes first and second fluid pressure control devices 12 and 14, a fluid flow control valve assembly 16, illustrated in FIG. 2, and a pump and motor assembly 18, illustrated in FIG. 3. The pressure control devices 12 and 14 are embodied as hydraulic cylinder assemblies. However, other types of fluid pressure control devices, such as pneumatic cylinder assemblies, could be used.

Figure 5:
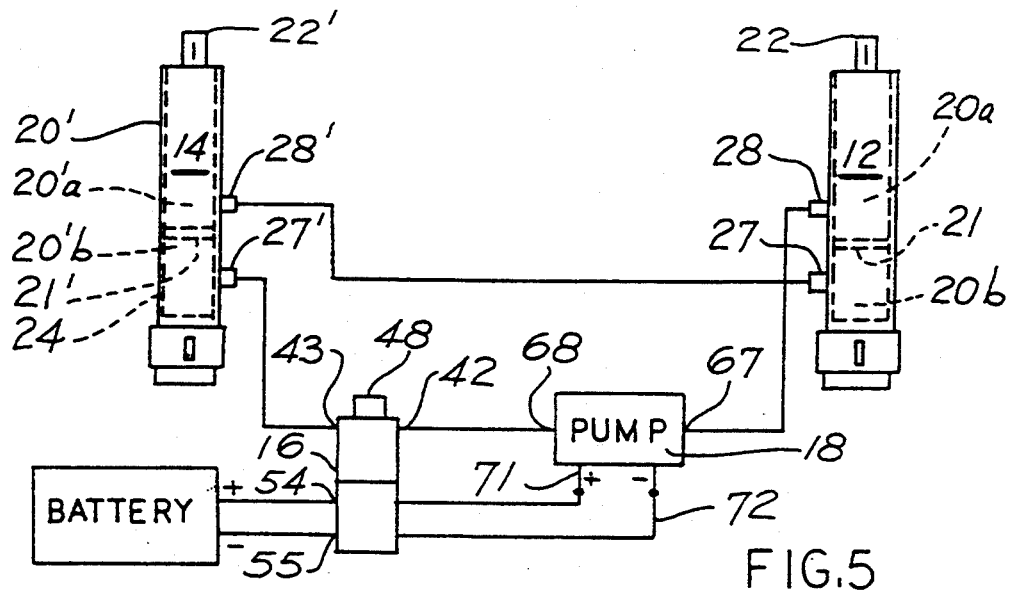
FIG. 5 is a simplified representation of the hydraulic circuit of the hydraulic power seat adjuster mechanism illustrated in FIG. 1.

The hydraulic cylinder assembly 12, which is shown in FIG. 1 detached from the seat pan 11, is located at the left or outboard side of the seat pan 11. The hydraulic cylinder assembly 14 is located at the right or inboard side of the seat pan 11. The control valve assembly 16 and the pump and motor assembly 18 are mounted in a channel 11b in the undersurface of the seat pan 11 at the front or forward end 11a of the seat pan. The cross section of the channel 11b is indicated by the section in FIG. 1. The hydraulic lines which interconnect the hydraulic cylinder assemblies 12 and 14, the fluid control valve assembly 16 and the pump and motor assembly 18 are not shown in FIG. 1, but these connections are shown in FIG. 5 which is a representation of the hydraulic circuit of the hydraulic power seat adjuster mechanism.

Figure 4:
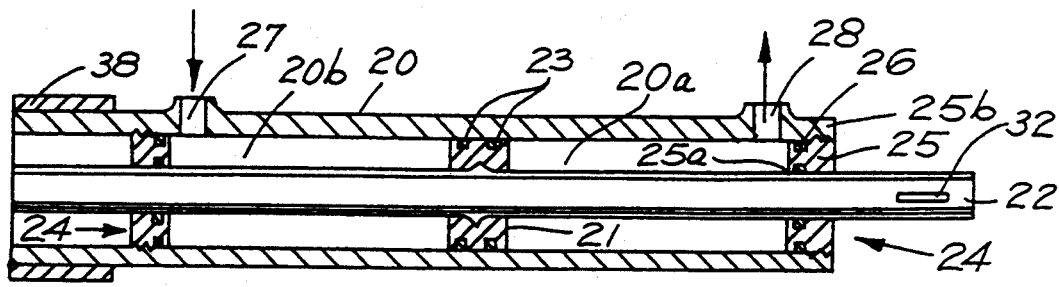
FIG. 4 is a longitudinal section view of the hydraulic cylinder of the hydraulic seat adjuster mechanism of FIG. 1.

Referring to FIG. 4, the hydraulic cylinder assembly 12 includes a tubular housing or cylinder 20 and a piston 21 which is carried on a piston rod 22 and is moveable axially within the cylinder. The piston 21 divides the interior of the cylinder into a rearward compartment 20a at the pressure side of the piston and a forward compartment 20b at the return side of the piston. The piston 21 is an annular shaped member having sliding redundant seals 23 located around its peripheral edge which seal the two compartments from one another. The cylinder is closed at its ends by respective seal assemblies 24, each including a guide bushing 25 and O-ring seals 26. The guide bushing 25 has a central aperture 25a through which extends one end of the piston rod. The cylinder 20 has a fluid inlet 27 which is in fluid communication with the forward compartment 20b and a fluid outlet 28 which is in fluid communication with the rearward compartment 20a. In the exemplary embodiment, the cylinder 20 is extruded from aluminum and the piston rod is made of steel. The piston 21 and the guide bushings 25 are molded from a material such as Nylon, Teflon or the like. The piston is secured to the piston rod in a suitable manner. The bushings 25 have threaded outer surface portions 25b which engage threads on the inner surface of the cylinder at each end thereof.

Referring to FIG. 1, the piston rod 22 has an extension portion 32 which extends radially outwardly. The extension portion 32 has an aperture 36 by which the hydraulic cylinder assembly is secured to the seat pan 11 at its rearward end 11d by a suitable fastener (not shown) which extends through aperture 36 and an aperture 11e in the seat pan.

The forward end of the seat pan is supported by an annular guide member 38 which is mounted on the outer surface of the cylinder and is adapted to slide along the outer surface of the cylinder 20 near the forward end of the seat assembly. The annular guide member 38 has a tab 38a with an aperture 38b therein to facilitate attachment of the guide member 38 to the seat pan by a suitable fastener (not shown) which extends through aperture 38b and an aperture 11f in the seat pan. The guide member 38 is made of Teflon or other suitable material. The hydraulic cylinder assembly 12 provides both the horizontal force to move the seat assembly fore and aft and sliding guidance for the seat assembly in its fore-and-aft movement. The cylinder 20 has lugs 37 at each end to facilitate attachment of the hydraulic cylinder assembly 12 to the floor pan of the vehicle.

The hydraulic cylinder assembly 14 is identical to hydraulic cylinder assembly 12. Accordingly, like elements have been given the same reference numerals with a prime notation.

Referring to FIG. 2, the control valve assembly 16 includes a cylindrical housing 40 having an open end 40a and a closed end 40b with a central chamber 41. The central chamber 41 defines a valve inlet 42 and a valve outlet 43 for the control valve assembly. The valve inlet 42 and the valve outlet 43 are located at diametrically opposed positions on the housing 40. A valve member or spool piston 44, having a valve head portion with an annular groove 45 therein, is movable axially of the chamber 41. The housing 40 includes a plurality of O-rings 46 forming a seal at one end 44a of the spool piston and an O-ring 47 forming a seal at the other end 44b of the spool piston to define a fluid tight compartment in which the valve head portion of the spool piston slides. The spool piston defines a plunger 48 which extends through the open end of the housing for manually operating the control valve assembly. When the plunger 48 is depressed, the spool piston is moved axially of the housing from a flow preventing position, which is illustrated in FIG. 2, to a flow permitting position whereat the annular groove 45 is indexed with the valve inlet and outlet so that the valve inlet 42 is communicated with the valve outlet 43 by the annular groove 45. A return spring 49 located within a chamber 41 of the housing 40 biases the spool piston to its flow preventing position. A two-way rocker switch 55 for energizing the electric motor and pump assembly 18 is mounted in the tip of the plunger 48.

Referring to FIG. 3, the pump and motor assembly 18 includes a screw pump 60, having helical rotor 61, and a bidirectional motor 62 which drives the helical rotor. The screw fluid drive pump is very efficient, even with a small helix angle, and is very quiet in operation. The pump and motor assembly 18 includes a cylindrical housing 63 with an inner wall 63a dividing the interior of the housing into a motor compartment 64 and a pump compartment 65. A seal member 66 isolates the motor compartment 64 from the pump compartment 65. The housing has openings through its sidewall defining a fluid inlet 67 and a fluid outlet 68 for pump compartment 65. The helical rotor 61 is located in pump compartment 65. The motor 62 is located in the motor compartment 64. The motor 62 has terminals 71 and 72 which extend through the end wall of the housing to facilitate connection of electrical power is applied to the motor.

Referring to FIG. 5, there is illustrated the hydraulic circuit for the hydraulic power seat adjuster mechanism 10 and the electrical circuit for the pump motor. The fluid outlet or high pressure side 28 of the hydraulic cylinder assembly 12 is connected to the fluid inlet 67 of the pump and motor assembly 18 which has its fluid outlet 68 connected to the fluid inlet 42 of the control valve assembly 16. The fluid outlet 43 of the control valve assembly is connected to the fluid inlet or return side 27' of the hydraulic cylinder assembly 14 which has its fluid outlet or pressure side 28' connected to the fluid inlet or return side 27 of the hydraulic cylinder assembly 12. Thus, the two hydraulic cylinder assemblies 12 and 14 are connected in a closed hydraulic loop, series hydraulic circuit with the control valve assembly 16 and the pump and motor assembly 18. The hydraulic fluid circuit has common fluid between both cylinders and only one valve actuates both cylinders, so that there is no problem of synchronization in the operation of the two hydraulic cylinder assemblies.

The positive terminal 71 and the negative or ground reference terminal 72 of the pump motor are connected to the positive and negative terminals of the vehicle battery through switch 55 of control valve assembly 16. The switch 55 is a rocker type switch which is operable to first and second positions to provide bidirectional operation of the motor to move the seat assembly forward or rearward.

The control valve assembly permits the hydraulic fluid to flow through the series hydraulic circuit only when the control valve assembly is operated to its fluid flow permitting position. When the spool piston is in its fluid flow preventing position, the pistons 21 and 21' of the two hydraulic cylinder assemblies are locked in place so that the seat assembly is locked in its adjusted position. In one embodiment of the hydraulic power seat adjuster mechanism 10 having one inch diameter pistons, the load capacity obtained is about 6280 pounds. The load capacity is the thrust load that a pair of hydraulic cylinders can carry in a crash situation. Maximum hydraulic pressure capacity for automobile brake systems is typically in the range of 3000 to 5000 pounds per square inch. The load capacity of the two hydraulic cylinder assemblies 12 and 14 is given by the relationship: $L = 2 \times P \times A$. For a piston head having a one inch diameter, the piston surface area "A" is 0.7854 in.$^2$ and for a pressure "P" of 4000 pounds per square inch, the load capacity is about 6280 pounds.

FIGS. 1 and 5 illustrate the fully retracted position of the pistons 21 and 21' of the hydraulic cylinder assemblies 12 and 14 when the seat position is set for its minimum spacing from the dashboard and steering column, etc. With the spool piston 44 in its flow preventing position, the fluid flow path is interrupted so that the pistons of the hydraulic cylinder assemblies 12 and 14 are locked in position, maintaining the seat assembly in the fore-and-aft position to which it has been set.

Referring to FIGS. 1 and 5, when the operator desires to change the fore-and-aft adjusted position of the seat assembly, the plunger 48 of the control valve assembly is depressed, moving the spool piston 44 so that the annular groove 45 is brought into alignment with the valve inlet 42 and valve outlet 43 of the control valve assembly, completing the hydraulic fluid circuit through the cylinder assemblies 12 and 14. In addition, the switch 55 is depressed and held depressed to energize the pump motor to cause hydraulic fluid to be circulated though the hydraulic circuit. In this example, where the seat assembly is in its forwardmost position, the switch 55 is operated to cause the pistons to be moved rearwardly to move the seat assembly rearwardly. The hydraulic fluid flows from the outlet of the screw pump 60 and through the control valve of the control valve assembly into the inlet 27' of the cylinder 20', driving the piston 21' rearwardly. The fluid forced from the compartment 20a' as the piston 21' is driven rearwardly, is delivered to the compartment 20b of the cylinder 20, driving piston 21 rearwardly, in turn forcing fluid out of the cylinder chamber 20a into the screw pump 60. As the pistons 21 and 21' are driven rearwardly, the seat assembly is moved rearwardly.

When the seat assembly has been moved to the desired position, the occupant releases the plunger 48 and the restoring spring 49 (FIG. 2) restores the spool piston 44, interrupting the fluid flow path. Also, the switch 55 restores, so that the pump motor is disconnected from the battery. When the fluid flow path is interrupted, the pistons 21 and 21' are locked in the position to which they have been moved so that the vehicle seat is maintained in the position to which it has been adjusted.

Adjustment of the seat in the forward direction is effected in the same manner except that the switch 55 is operated in the opposite direction to cause the pump to operate in the opposite direction, reversing the direction of fluid flow through the hydraulic circuit.

Figure 6:
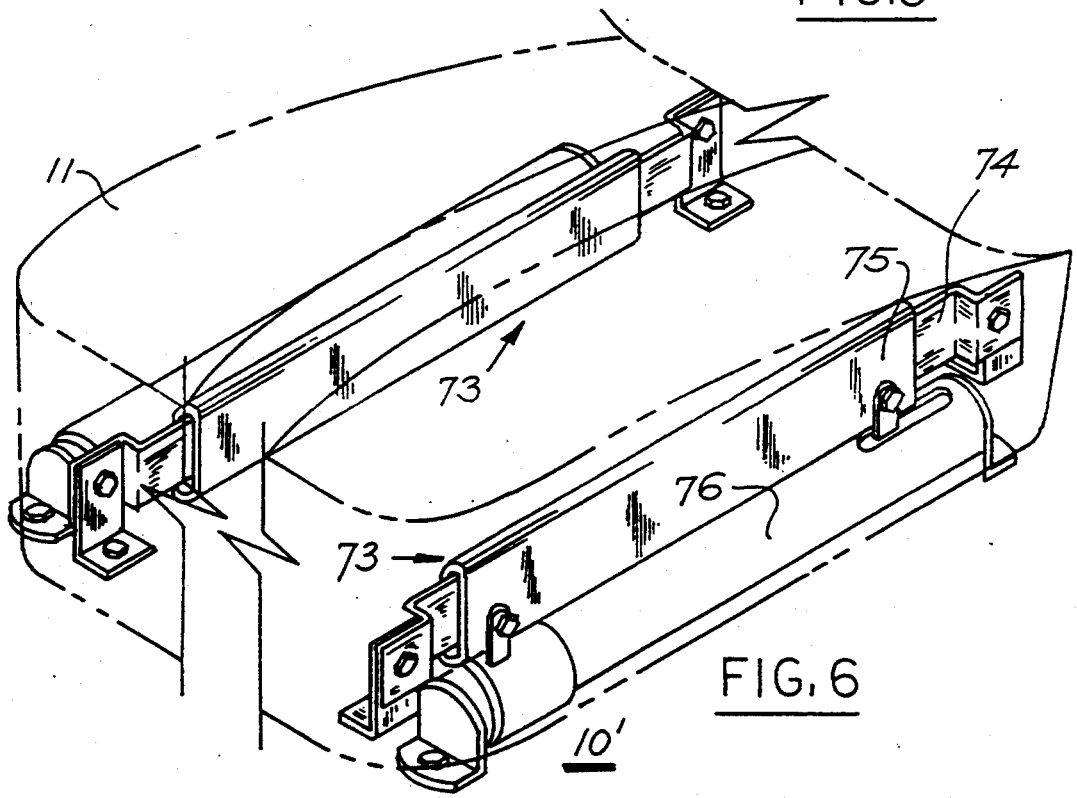
FIG. 6 is an isometric view of a second embodiment of a hydraulic power seat adjuster mechanism provided by the present invention.

Referring to FIG. 6, there is illustrated a second embodiment of a power hydraulic seat adjuster mechanism 10' provided by the present invention. In this embodiment, the seat assembly 11, is supported by sliding rail assemblies 73 at each side of the seat. Each sliding rail assembly 73 includes a lower rail 74 which is mounted to the floor pan of the vehicle and an upper rail 75 adapted for sliding movement within the lower rail. The seat pan is mounted on and carried by the upper rail. The upper rail is coupled to the lower rail by a hydraulic cylinder assembly 76 which is similar to hydraulic cylinder assembly 20. Fore and aft movement of the upper rails, and of the seat carried by the upper rails is provided by operating the hydraulic cylinder assemblies in the manner described with respect to the hydraulic seat adjuster mechanism 10. The sliding rail assemblies may include channel/ball and roller guidance systems of the type used in conventional seat track assemblies for motor vehicles. In the hydraulic seat adjuster mechanism 10' the sliding rail assemblies provide the support and guidance for the seat assembly and the hydraulic cylinder assemblies provide the horizontal driving force.

The foregoing descriptions are those for a powered system which includes a pump and motor assembly which moves the fluid through the closed fluid loop when the control valve is in its fluid flow permitting condition. In accordance with a manually powered system 10" for a seat adjuster mechanism illustrated in FIG. 7, a return tension spring 77, which is tensioned as the seat is moved rearwardly, pulls the seat forward when the seat subsequently is released, causing the fluid to transfer between cylinders. Rearward adjustment of the seat requires a rearward effort from the occupant by pushing against the steering wheel and the floor of the vehicle while leaning against the seat back.

Figure 7:
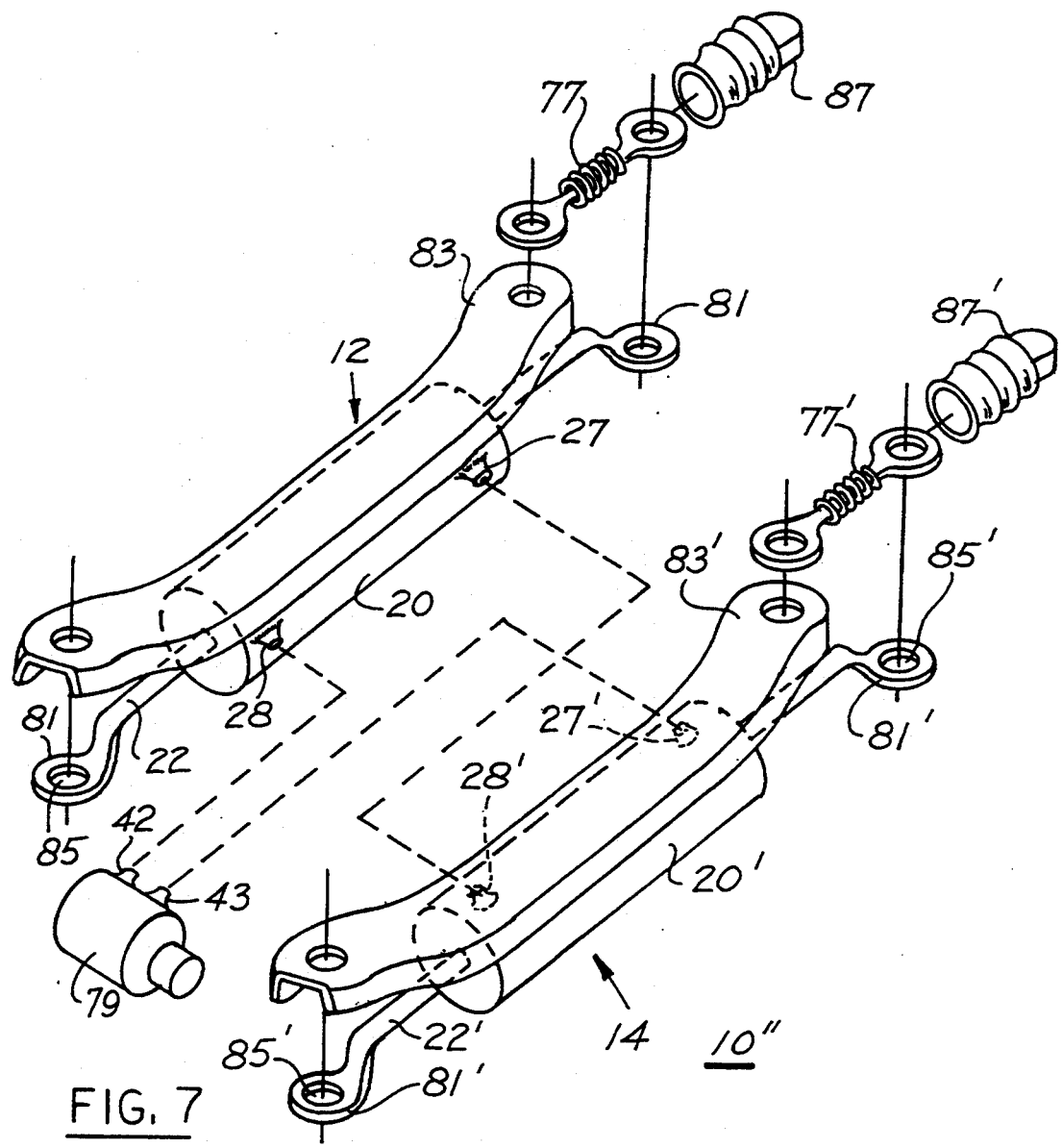
FIG. 7 is a isometric view of an embodiment of a manual hydraulic seat adjuster mechanism provided by the present invention.

Referring to FIG. 7, the seat adjuster mechanism 10" includes two hydraulic cylinder assemblies and a control valve assembly 79. The hydraulic cylinder assemblies are substantially the same as the cylinder assemblies 12 and 14 for seat adjuster mechanism 10, and accordingly, have been given the same reference numbers. In the cylinder assemblies shown in FIG. 7, the piston rod 22 is formed with a floor mount 81 at each end and the piston rod is fixed to the floor of the vehicle and the cylinder 20 is movable relative to the piston rod 22. Also, the seat pan mounts 83 are secured to the cylinder 20 and movable therewith for repositioning the seat. Otherwise, the construction of the cylinder assemblies is as illustrated in FIG. 4. The floor mounts 81 include apertures 85 to facilitate securing the cylinder 20 to the floor of the vehicle with suitable fasteners, such as bolts. The heads of the bolts may be covered by rubber boots 87 at least at the front of the seat assembly. The return tension spring 77 is mounted between the end of one of the seat pan mounts and the floor mount 81.

As is the case for the hydraulic seat adjustment mechanism 10, relative movement between the cylinders 20 and 20' and the associated pistons 21 and 21' is permitted only when the valve is operated to its fluid flow permitting condition. As the cylinder 20 is moved relative to the fixed piston 21 and piston rod 22, hydraulic fluid is moved into chamber 20b and hydraulic fluid is moved out of chamber 20a for forward adjustment of the seat, and hydraulic fluid is moved out of the chamber 20b and into chamber 20a for rearward adjustment of the seat.

The fluid outlet or high pressure side 28 of the hydraulic cylinder assembly 12 is connected to the fluid inlet 42 of the control valve assembly 79. The fluid outlet 43 of the control valve assembly is connected to the fluid inlet or return side 27' of the hydraulic cylinder assembly 14 which has its fluid outlet or pressure side 28' connected to the fluid inlet or return side 27 of the hydraulic cylinder assembly 12. Thus, the two hydraulic cylinder assemblies 12 and 14 are connected in a closed hydraulic loop, series hydraulic circuit with the control valve assembly 79.

Figure 8:
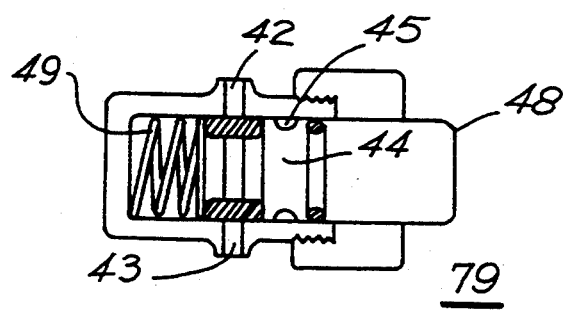
FIG. 8 is a section view of the control valve assembly of the hydraulic recliner mechanism of in FIG. 7.

Referring to FIG. 8, the control valve assembly 79 is similar to control valve assembly 16, and accordingly, like elements have been given the same reference numeral and the control valve assembly 79 will not be described in detail. The hydraulically controlled seat adjuster 10" is manually operable and accordingly does not include a pump and motor assembly or the switch assembly as is provided for seat adjuster 10.

Referring to FIG. 9, there is illustrated a hydraulic recliner mechanism 80 for a vehicle seat assembly 82 having a seat back frame 84 mounted to a seat pan 86. The seat pan 86 has vertical uprights 86a at both sides which are adapted to mount the seat back frame to the seat pan for movement about pivot axis 84a relative to the seat pan 86. The hydraulic recliner mechanism 80 controls the adjustment of the angle of inclination of the seat back frame 84 relative to the seat pan 86. The hydraulic recliner mechanism 80 includes a pair of hydraulic cylinder assemblies 90 and 92 and the fluid flow control valve assembly 79 (FIG. 8). The fluid flow control valve assembly 79 is located for convenient access by occupants of the seat. The hydraulic cylinder assembly 90 is located at the left side of the seat assembly 82 in a channel 88 in the underside of the seat pan. The hydraulic cylinder assembly 92 is located at the right side of the seat assembly 82 in a channel 88a in the underside of the seat pan.

The hydraulic cylinder assembly 90 is similar to hydraulic cylinder assembly 12, and accordingly, like elements have been given the same reference numeral and the hydraulic cylinder assembly 90 will not be described in detail. The cylinder 20 of the hydraulic cylinder assembly 90 is located in a lateral channel 88 in the undersurface of the seat pan 11, extending horizontally and having a connecting lug 37a at one end which is connected to the seat pan 82. The piston rod 22 extends through an opening in the end wall at the other end of the cylinder 20 and is connected to upright 86a to which is connected the seat back frame 84. The piston rod has a connecting lug 22a with an aperture 22b therein to facilitate securing the hydraulic cylinder assembly 90 to the upright 86a by a suitable fastener (not shown) which extends through aperture 22b and an aperture 86b in the upright. The hydraulic cylinder assembly 90 has a restoring spring 96 extending around the piston rod 22 for restoring the piston 21 to the position corresponding to the upright position for the seat back frame.

The hydraulic cylinder assembly 92 is similar to hydraulic cylinder assembly 90, and accordingly, like elements have been given the same reference numerals with as prime notation.

Referring to FIG. 10, each of the hydraulic cylinder assemblies of the hydraulic recliner mechanism, such as hydraulic cylinder assembly 90, may be part of an add-on device 100 which is adapted to connect a conventional seat back frame to a conventional seat pan and provide the pivoting action of the seat back relative to the seat pan. Each add-on device 100 includes a base 101 defining a channel 102 in which the hydraulic recliner mechanism is located and a shoe 103 adapted to receive and secure the lower end of the seat back frame and to be pivotally connected to the base at pivot point 104 and to the piston rod 22 at pivot point 105. The base 101 is connectable to the seat pan by bolts which pass through bolt holes 106 in the base and in the seat pan. The shoe 103 is connectable to the seat back frame by bolts which pass through bolt holes 107 in the shoe and in the seat back frame.

Referring to FIG. 11, which illustrates the hydraulic circuit for the hydraulic recliner mechanism 80, the two hydraulic cylinder assemblies 90 and 92 are connected in a closed hydraulic loop with the control valve assembly 79. The fluid outlet or pressure side 28 of the hydraulic cylinder 90 is connected to the fluid inlet 42 of the control valve assembly 79. The fluid outlet 43 of the control valve assembly 79 is connected to the fluid inlet or return side 27' of the hydraulic cylinder 92. The fluid outlet or pressure side 28' of the hydraulic cylinder 92 is connected to the fluid inlet or return side 27 of the hydraulic cylinder 90.

In an alternative embodiment, the seat recliner mechanism includes a pump and motor assembly, such as pump and motor assembly 18 shown in FIG. 3 for the hydraulic cylinder mechanism, to permit the seat back to be driven in both forward and rearward positions in adjusting the inclination of the seat back between a full upright position and a reclined position. In this embodiment, the hydraulic circuit for a hydraulic power seat recliner mechanism is the same as that shown in FIG. 4 for the power hydraulic seat adjuster mechanism 10 and includes a suitable electrical switch, such as rocker switch 55, for selecting the direction of fluid flow through the closed loop hydraulic circuit. The pump and motor assembly and the rocker switch supplements or replaces the restoring springs 96 in this embodiment.

FIG. 9 illustrates the seat back frame in the upright position. Initially, the spool piston 44 of the control valve assembly 79 is in its fluid flow preventing position, interrupting the fluid flow path so that the pistons 21 and 21' of the two hydraulic cylinder assemblies 90 and 92 are locked in position. The pistons 21 and 21' are positioned rearwardly of the cylinders 20 and 20' so that the pistons 21 and 21' are extended relative to the cylinders 20 and 20'. Referring to FIGS. 8, 9 and 11, when the occupant of the seat desires to change the inclination of the seat back relative to the seat, the plunger 48 of the control valve assembly is depressed, moving the spool piston 44 so that the annular groove 45 is brought into alignment with the inlet 42 and outlet 43 of the control valve assembly. When the control valve assembly is operated to its flow permitting position, then as the seat back frame is pivoted rearwardly as the occupant leans backwards against the seat back, the pistons 21 and 21' are moved forwardly against the force of restoring springs 96 and 96', compressing the springs. As the pistons 21 and 21' are moved forwardly, hydraulic fluid is moved or circulated through the hydraulic circuit, flowing out from compartment 20b of cylinder 90 and into compartment 20a' of cylinder 92 and at the same time, flowing out from compartment 20b' of cylinder 92, through the control valve assembly 79 and into the compartment 20a of cylinder 90. When the plunger 48 is released, the return spring 49 restores the spool piston 44 to its at rest or fluid flow preventing position so that the fluid flow path is interrupted and the pistons 21 and 21' of the hydraulic cylinder assemblies 90 and 92 are locked in the position to which they have been moved. When the fluid flow path is interrupted, further repositioning of the seat back frame is prevented by the hydraulic circuit and the seat back frame is maintained in the position to which it has been adjusted.

When the occupant wishes to return the seat back to its upright position, the plunger 48 is depressed and the occupant leans forward. The pistons 21 and 21' are restored by the restoring springs 96 and 96', moving the seat back towards the upright position as fluid is transferred from compartments 20a and 20a' to respective compartments 20b' and 20b. When the occupant releases the plunger, either at the full upright position or a position intermediate the full upright position and the position to which the seat back was previously adjusted, the spool piston 44 is restored by the restoring spring 49 which moves the spool piston to its flow preventing position. When the spool piston 44 is moved to its flow preventing position, the pistons 21 and 21' are locked in the positions to which they have been moved, either the full upright position or any position intermediate the full upright position and the position to which the seat back was previously adjusted.

Thus, it has been shown that the present invention provides a hydraulically controlled seat adjuster mechanism for providing fore-and-aft adjustment in the position of a vehicle seat assembly. The hydraulically controlled seat adjuster mechanism includes first and second hydraulic cylinders which are connected in a series hydraulic circuit with a pump and motor assembly and a control valve assembly. Connecting the two hydraulic cylinders in a series hydraulic circuit simplifies the hydraulic cylinders because no internal valving and control is required for the hydraulic cylinders. The fore-and-aft position of the seat assembly can be changed only by manually operating the control valve. The pump and motor assembly and the control valve assembly permit bidirectional fluid flow through the hydraulic circuit. Also, because the fluid is common to both hydraulic cylinders and is controlled by one control valve, the operation of both hydraulic cylinders is synchronized automatically. When the control valve is released, the seat assembly is locked in the position to which it has been adjusted. In one embodiment, the hydraulically controlled seat adjuster mechanism provides both sliding guidance and the horizontal driving force for the seat assembly. In another embodiment, sliding rail assemblies provide the support and guidance for the seat assembly and the hydraulic cylinder assemblies provide only the horizontal driving force. In accordance with further embodiments, a hydraulic mechanism, including a closed loop hydraulic circuit and a manually operated valve, controls the adjustment of the angle of inclination of the seat back relative to the seat cushion. The transfer of fluid between the cylinders of the hydraulically controlled recliner mechanism may be effected manually or by the use of pump and motor assembly.

I claim:

1. In a vehicle seat assembly including a seat frame and a seat back having first and second sides, fluid pressure means for adjusting the angle of inclination of the seat back relative to the seat frame, said fluid pressure means comprising:

means including a first fluid pressure device connecting said first side of the seat back to the frame, said first fluid pressure device having a first fluid chamber and a first piston adapted for reciprocating movement within said first fluid chamber;

means including a second fluid pressure device connecting said second side of the seat back to the frame, said second fluid pressure device having a second fluid chamber and a second piston adapted for reciprocating movement within said second fluid chamber; and fluid flow control means connecting said first and second fluid pressure devices in a series closed loop fluid circuit, said fluid flow control means including valve means having a valve member operable between fluid flow preventing and fluid flow permitting positions, biasing means for producing a force for maintaining said valve member in said fluid flow preventing position for preventing fluid flow through said closed loop fluid circuit to thereby prevent said first and second pistons from moving within said chambers so that said seat back is maintained at a position to which it has been adjusted, and means manually operable for moving said valve member against the force of said biasing means from said flow preventing position to said fluid flow permitting position, thereby permitting said first and second pistons to move within said within said chambers, allowing the seat back to pivot relative to the seat frame to adjust the angle of inclination of the seat back relative to the seat frame.

2. The seat assembly according to claim 1, wherein each of said fluid pressure devices comprises hydraulic means having a cylinder housing defining said fluid chamber which is oriented horizontally and adapted to be connected to said seat frame, and wherein each of said pistons is coupled to the seat back.

3. The seat assembly according to claim 2, wherein said first and second pistons are movable between first and second positions corresponding to full upright and inclined positions, respectively, for the seat back, and at least said first fluid pressure device including biasing means urging said first piston toward said first position.

4. The seat assembly according to claim 2, wherein said fluid flow control means includes fluid pumping means connected in said series closed loop fluid circuit, and energizing means for energizing said fluid pumping means to cause said fluid pumping means to operate when said valve means is operated and circulate fluid through said cylinders of said hydraulic cylinder means to move said first and second pistons.

5. The seat assembly according to claim 1, wherein each of said fluid pressure devices comprises a hydraulic cylinder assembly, said first fluid chamber of said first hydraulic cylinder assembly having a fluid inlet and a fluid outlet, and said second fluid chamber of said second hydraulic cylinder assembly having a fluid inlet and a fluid outlet, said valve means being connected between said fluid outlet of said first fluid chamber and said fluid inlet of said second fluid chamber, and a hydraulic line connecting said fluid outlet of said second fluid chamber to said fluid inlet of said first fluid chamber.

6. The seat assembly according to claim 1, wherein said valve means includes a valve housing defining a valve chamber having a valve inlet and a valve outlet, said valve member being located within said valve chamber for movement between said fluid flow preventing and fluid flow permitting positions, said valve inlet being communicated with said valve outlet only when said valve member is in said fluid flow permitting position, and wherein said means for moving said valve member comprises a plunger which extends through said valve housing for moving said valve member from said fluid flow preventing position to said fluid flow permitting position.

* * * * *